(12) United States Patent
Sugano et al.

(10) Patent No.: US 7,575,176 B2
(45) Date of Patent: Aug. 18, 2009

(54) TAG ACCESS CONTROL SYSTEM, TAG ACCESS CONTROL METHOD AND RECORDING MEDIUM STORING TAG ACCESS CONTROL PROGRAM

(75) Inventors: Hiroyasu Sugano, Kawasaki (JP); Kazuki Matsui, Kawasaki (JP); Hideto Kihara, Kawasaki (JP); Noboru Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 165 days.

(21) Appl. No.: 11/442,972

(22) Filed: May 31, 2006

(65) Prior Publication Data

US 2007/0119932 A1 May 31, 2007

(30) Foreign Application Priority Data

Nov. 30, 2005 (JP) ............................. 2005-347072

(51) Int. Cl.
*G06K 19/06* (2006.01)
(52) U.S. Cl. ..................................................... 235/492
(58) Field of Classification Search ................ 235/451, 235/492, 375–385; 340/10.1, 10.2, 10.3, 340/10.31, 10.32, 10.33, 10.34, 10.4, 10.41, 340/10.42, 10.5, 10.51, 10.52, 10.6, 571, 340/572.1–572.9, 10, 572
See application file for complete search history.

(56) References Cited

U.S. PATENT DOCUMENTS

| | | | | |
|---|---|---|---|---|
| 6,590,884 B1 * | 7/2003 | Panasik | ....................... | 370/338 |
| 6,732,925 B1 * | 5/2004 | Takayasu | ..................... | 235/451 |
| 2004/0036623 A1 * | 2/2004 | Chung | ................... | 340/825.49 |

FOREIGN PATENT DOCUMENTS

JP 2004-82432 3/2004

* cited by examiner

*Primary Examiner*—Kumiko C Koyama
(74) *Attorney, Agent, or Firm*—Staas & Halsey LLP

(57) ABSTRACT

A tag access control system for controlling data communication between a plurality of reader/writers respectively having a plurality of antennas and one or more IC tags moving sequentially through communication ranges of the plurality of antennas includes a storing portion for storing movement information and reader/writer information, a command accepting portion for accepting a command, a dividing portion for generating a plurality of divided commands from the command, a detecting portion for detecting the IC tag located within the communication range of the antenna in one reader/writer of the plurality of reader/writers, a job controlling portion for sequentially assigning the plurality of reader/writers the plurality of divided commands according to the movement information and the reader/writer information, and a returning portion for returning a result of processing the command. In this way, the tag access control system can improve a success rate of reading data from and writing data in a plurality of IC tags without lowering a moving velocity of articles.

8 Claims, 12 Drawing Sheets

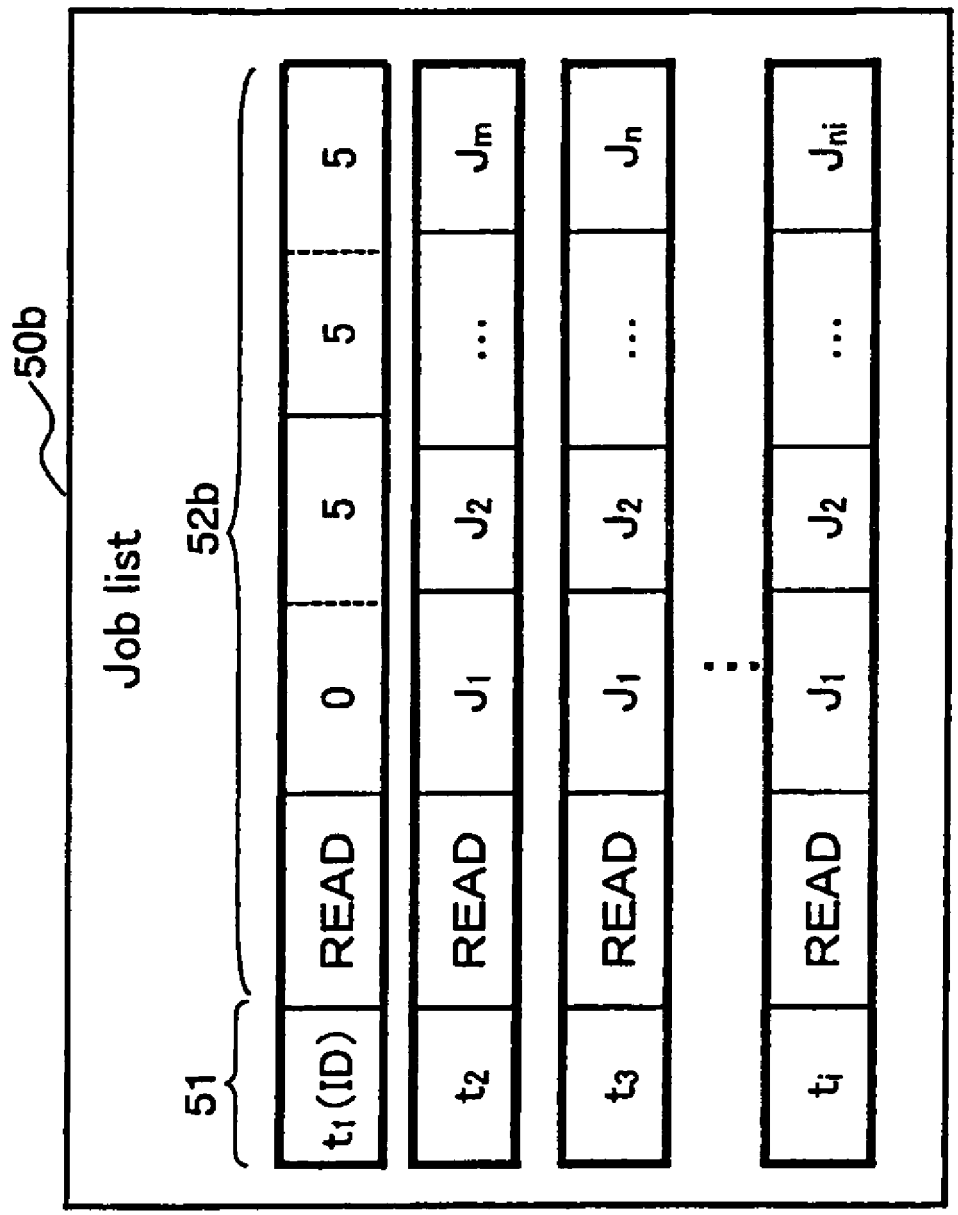

| Job list | | | | | | 50c |
|---|---|---|---|---|---|---|
| $t_2$ | READ | $J_3$ | $J_4$ | ... | $J_n$ | |
| $t_3$ | READ | $J_1$ | $J_2$ | ... | $J_n$ | |
| ... | | | | | | |
| $t_i$ | READ | $J_1$ | $J_2$ | ... | $J_{ni}$ | |

FIG. 6C

| ID | Division number | Completion | Devided command |     |     |     |
|----|-----------------|------------|-----|-----|-----|-----|
| $t_1$ | m | 1 | - |   |   |   |
| $t_2$ | n | 0 | $J_1$ | $J_2$ | ... | $J_n$ |
| $t_3$ | n | 0 | $J_1$ | $J_2$ | ... | $J_n$ |
| ... |   |   |   |   |   |   |
| $t_i$ |   | 1 | - |   |   |   |
| ... |   |   |   |   |   |   |

FIG.7

| Group ID | Completion | ID of member IC tag |     |     |
|----------|------------|---------------------|-----|-----|
| $G_1$ | 1 |   |   |   |
| $G_2$ | 0 | $t_1$ | $t_2$ | ... | $t_i$ |
| ... |   |   |   |   |
| $G_j$ | 1 |   |   |   |

| WRITE | Worker ID (data name) | yamada(data) | Passage time h1 | 20051119 1030 |

| Data name | Offset | Size |
|---|---|---|
| Worker ID | 0 | 10 |
| Passage time h1 | 32 | 15 |

TAG ACCESS CONTROL SYSTEM, TAG ACCESS CONTROL METHOD AND RECORDING MEDIUM STORING TAG ACCESS CONTROL PROGRAM

BACKGROUND OF THE INVENTION

1. Field of the Invention

The present invention relates to a tag access control system, a tag access control method and a tag access control program for controlling data communication between IC tags provided in moving articles and a plurality of reader/writers.

2. Description of Related Art

In recent years, attention has been given to an RFID (Radio Frequency Identification) technology for recognizing an article using an IC tag. For example, in a factory or a distribution center, articles such as components or products are transported by a belt conveyor, a forklift, a truck or the like. By providing such articles with IC tags, it is possible to identify and manage the transported articles. In particular, passive-type IC tags require no batteries, so that the reduction of size and price can be achieved. Accordingly, they are expected to suit the identification and management of a large volume of articles.

The passive-type IC tag exchanges data by radio with a reader/writer having an antenna. In the case where the reader/writer reads data from and writes data into the IC tag attached to a transported article, an access to the moving IC tag is sometimes necessary. However, in the data communications with the moving IC tag, a failure rate of reading and writing rises sharply when the moving velocity of the IC tag is increased to or above a certain value. Therefore, it has been necessary to stop moving the articles temporarily within a communicable range of the antenna or move the articles at a sufficiently low velocity at the expense of turnover. Under such circumstances, there has been a need for a technology that improves an entire efficiency without lowering the velocity of moving the articles to which the tags are attached.

Conventionally, in order to read and write data as quickly as possible, technologies of the reader/writer (R/W) and the antenna have been developed for shortening the time required for data communications and the reading and writing time of IC tags. However, there has been a limit to processing capacities of a single reader/writer and a single antenna.

Accordingly, JP 2004-82432 A, for example, has disclosed a label printer that uses a plurality of reader/writers, thereby reducing a writing failure rate while maintaining a recording velocity. In this label printer, if one reader/writer fails to write data in an IC tag, the other reader/writer writes the data therein again. Also, in the case where data to be written are equal to or larger than a certain size, the plurality of reader/writers write divided data in an IC tag.

SUMMARY OF THE INVENTION

However, the invention described in JP 2004-82432 A presupposes an access to, at the most, one tag at one time. On the other hand, for example, at the site of production and distribution, a plurality of IC tags generally come into a communication range of a single antenna at one time. Thus, there is a need for a technology of handling a group of IC tags that move while occupying a certain spatial region.

With the foregoing in mind, it is an object of the present invention to provide a tag access control system, a tag access control method and a tag access control program capable of improving a success rate of reading data from and writing data in a plurality of IC tags without lowering a moving velocity of articles.

A tag access control system according to the present invention is a tag access control system for controlling data communication between a plurality of reader/writers respectively connected to a plurality of antennas provided along a moving path of one or more articles provided with one or more IC tags and the IC tags provided in the articles moving sequentially through communication ranges of the plurality of antennas. The tag access control system includes a storing portion for storing movement information about how the articles move and reader/writer information indicating an arrangement of the antennas connected with the reader/writers, a command accepting portion for accepting, from an upper system, a command indicating an instruction to write data in the IC tags or an instruction to read data from the IC tags, a dividing portion for generating a plurality of divided commands for executing the instruction indicated by the command, a detecting portion for causing at least one reader/writer of the plurality of reader/writers to detect an identifier of at least one of the IC tags located within the communication range of the antenna in the one reader/writer, a job controlling portion for generating a job list, which is data associating the plurality of divided commands with each of the identifiers of the IC tags detected by the detecting portion, and sequentially assigning the plurality of reader/writers the plurality of divided commands contained in the job list according to how the IC tags move indicated by the movement information and the arrangement of the antennas indicated by the reader/writer information, and a returning portion for returning a result of processing the command accepted by the command accepting portion to the upper system based on a result of executing the plurality of divided commands.

Since the job controlling portion assigns the plurality of reader/writers the plurality of divided commands generated by the dividing portion, one command can be distributed to and executed by a plurality of reader/writers. The antennas respectively provided in the plurality of reader/writers are arranged along the moving path of the IC tags. Thus, when an article provided with the IC tags moves sequentially through the communication ranges of the plurality of antennas, the divided commands for the IC tags are distributed to and executed by the respective reader/writers. Since the job controlling portion assigns the divided commands according to how the IC tags move and the arrangement of the reader/writers, it is possible to assign the divided commands to appropriate reader/writers in a timely manner. As a result, the success rate of the command can be improved without lowering the moving velocity of the articles.

Further, the identifiers of the IC tags detected by the detecting portion are stored in the job list in association with the plurality of divided commands, and thus, even when a plurality of IC tag identifiers are detected, a divided command is stored for each IC tag. The job controlling portion can assign the plurality of reader/writers the divided commands associated with the IC tag identifiers detected by the detecting portion. Accordingly, the processing for the plurality of IC tags does not have to be completed by the communication via one antenna alone but can be assigned to a plurality of reader/writers and executed by the communication via a plurality of antennas. Consequently, the success rate of processing for a plurality of IC tags improves.

Also, since the detecting portion causes the reader/writer to execute the processing of detecting an IC tag and the job controlling portion causes the reader/writers to execute the processing of reading data from and writing data in the IC tag, it is not necessary to complete the processing of detection and the data reading and writing processing with one reader/writer. Consequently, these processings can be distributed to a plurality of reader/writers, thus improving the success rate of the command.

A tag access control method according to the present invention is a tag access control method for controlling data communication between a plurality of reader/writers respectively connected to a plurality of antennas provided along a moving path of one or more articles provided with one or more IC tags and the IC tags provided in the articles moving sequentially through communication ranges of the plurality of antennas by using a computer. The tag access control method includes an operation in which the computer reads movement information about how the articles move and reader/writer information indicating an arrangement of the antennas connected with the reader/writers from a storing portion provided in the computer, an operation in which a command accepting portion provided in the computer accepts, from an upper system, a command indicating an instruction to write data in the IC tags or an instruction to read data from the IC tags, an operation in which a dividing portion provided in the computer generates a plurality of divided commands for executing the instruction indicated by the command, a detecting operation in which a detecting portion provided in the computer causes at least one reader/writer in the plurality of reader/writers to detect an identifier of at least one of the IC tags located within the communication range of an antenna of the one reader/writer, an operation in which a job controlling portion provided in the computer generates a job list, which is data associating the plurality of divided commands with each of the identifiers of the IC tags detected by the detecting operation, and sequentially assigns the plurality of reader/writers the plurality of divided commands contained in the job list according to how the IC tags move indicated by the movement information and the arrangement of the reader/writers indicated by the reader/writer information, and an operation in which a returning portion provided in the computer returns a result of processing the command accepted by the command accepting portion to the upper system based on a result of executing the plurality of divided commands.

A tag access control program stored in a recording medium according to the present invention is a tag access control program for causing a computer to execute a processing of controlling data communication between a plurality of reader/writers respectively connected to a plurality of antennas provided along a moving path of one or more articles provided with one or more IC tags and the IC tags provided in the articles moving sequentially through communication ranges of the plurality of antennas. The processing executed by the computer includes a processing of reading movement information about how the articles move and reader/writer information indicating an arrangement of the antennas connected with the reader/writers from a storing portion in the computer, a command accepting processing of accepting, from an upper system, a command indicating an instruction to write data in the IC tags or an instruction to read data from the IC tags, a dividing processing of generating a plurality of divided commands for executing the instruction indicated by the command, a detecting processing of causing at least one reader/writer of the plurality of reader/writers to detect an identifier of at least one of the IC tags located within the communication range of the antenna in the one reader/writer, a job controlling processing of generating a job list, which is data associating the plurality of divided commands with each of the identifiers of the IC tags detected by the detecting processing, and sequentially assigning the plurality of reader/writers the plurality of divided commands contained in the job list according to how the IC tags move indicated by the movement information and the arrangement of the antennas indicated by the reader/writer information, and a returning processing of returning a result of processing the command accepted in the command accepting processing to the upper system based on a result of executing the plurality of divided commands.

In accordance with the present invention, it is possible to provide a tag access control system, a tag access control method and a tag access control program capable of improving a success rate of reading data from and writing data in a plurality of IC tags without lowering a moving velocity of articles.

BRIEF DESCRIPTION OF THE DR/WINGS

Figures 3A, 3B, 4:
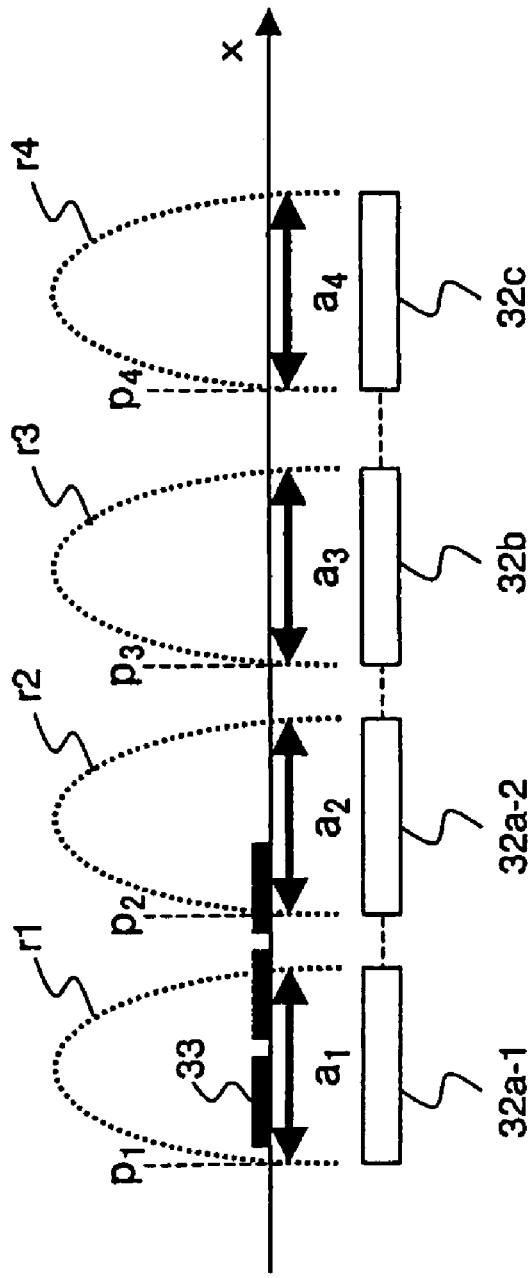
FIG. 3A illustrates an example of a command indicating an instruction to read data from an IC tag.
FIG. 3B illustrates an example of a command indicating an instruction to write data in an IC tag.

FIG. 4 schematically shows an example of data contained in R/W information 14.

Figure 5:
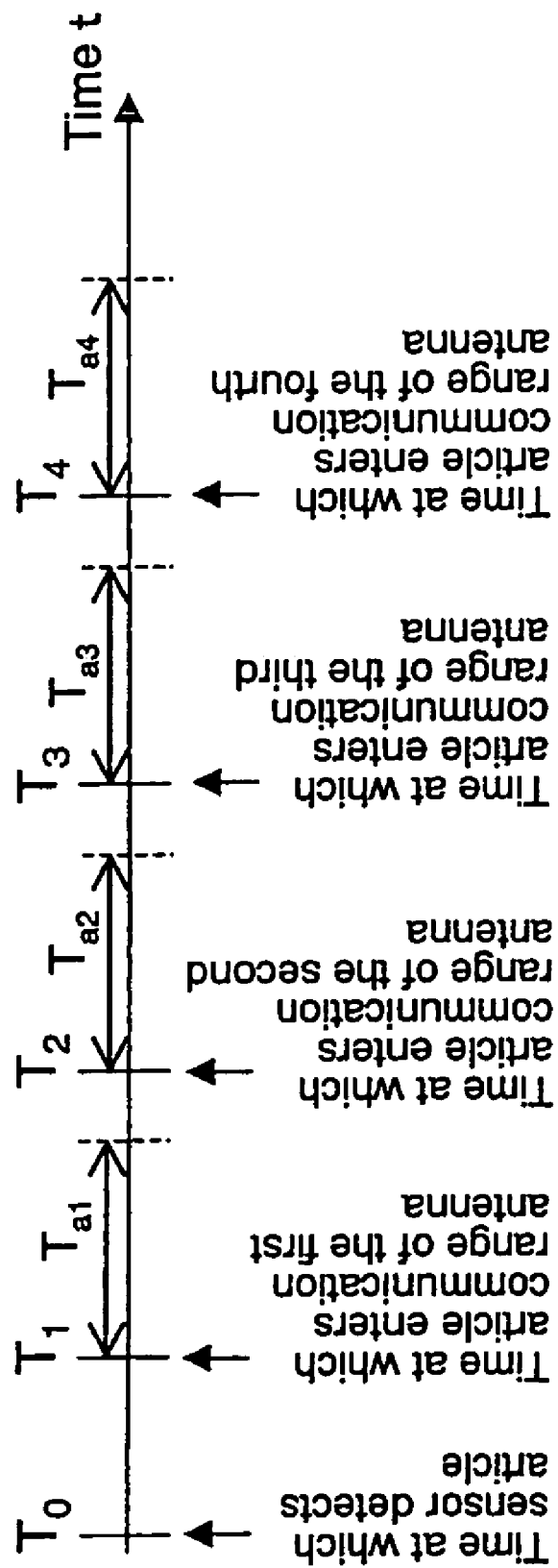

FIG. 5 schematically shows examples of times $T_1$, $T_2$, $T_3$ and $T_4$ and time periods $T_{a1}$, $T_{a2}$, $T_{a3}$ and $T_{a4}$.

Figure 6A:
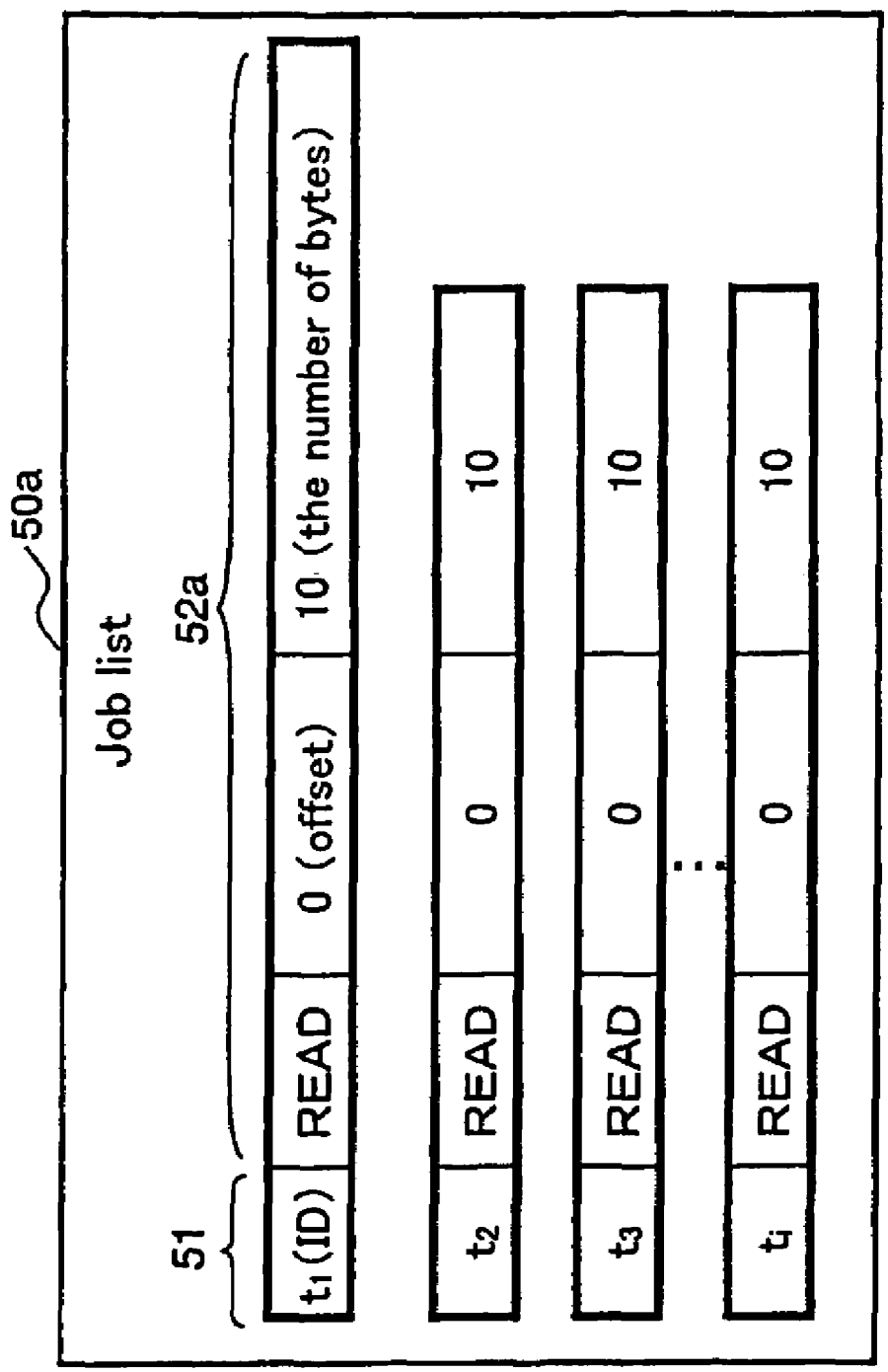

FIG. 6A illustrates an example of a job list in which IDs of IC tags detected by a detecting portion 4 are stored, FIG. 6B illustrates an example of a job list 50b newly generated by a dividing portion 5, FIG. 6C illustrates an example of a job list obtained by deleting successful divided commands from the job list 50b.

FIG. 7 illustrates an example of data representing results of processing divided commands.

FIG. 8 illustrates an example of data representing result of processing for each tag group.

Figure 9:
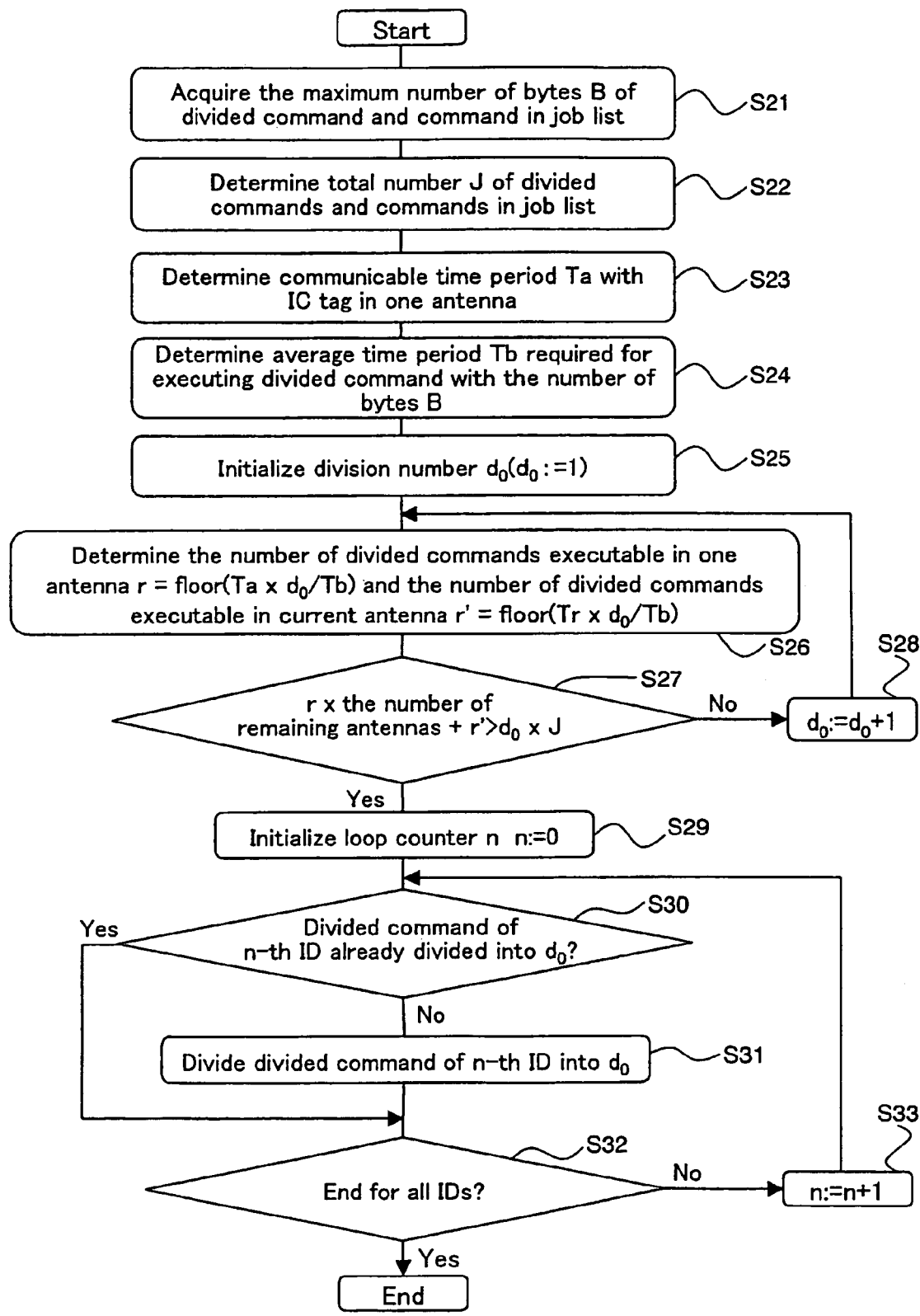

FIG. 9 is a flowchart showing a specific example of an operation in which the dividing portion 5 divides a command or a divided command in the job list.

Figure 10:
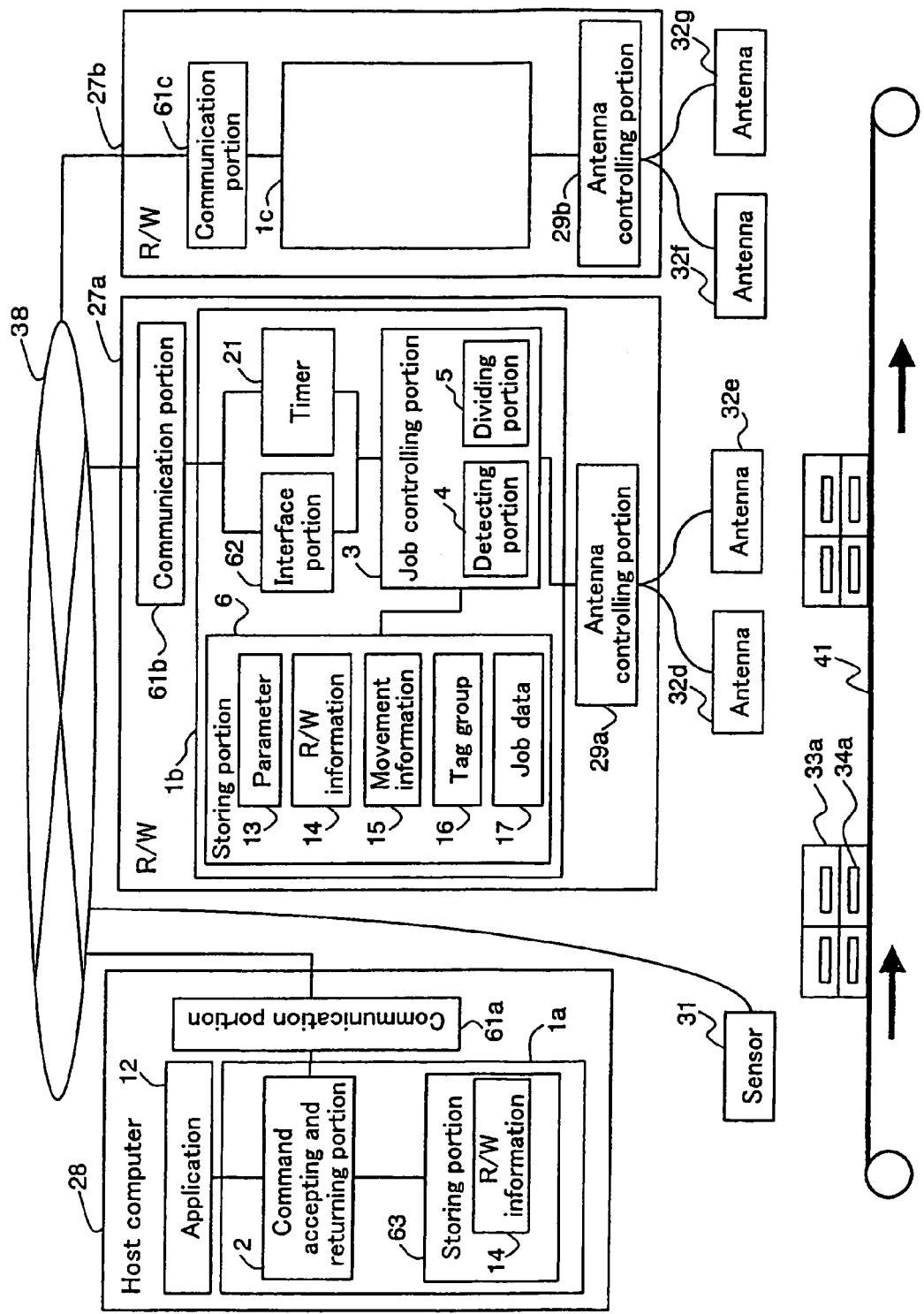

FIG. 10 is a functional block diagram showing a configuration of a tag access control system in Embodiment 2.

FIG. 11 illustrates an example of a command accepted by a command accepting and returning portion 2.

FIG. 12 illustrates an example of a data table showing an association between data names and IC tags.

Figure 13:
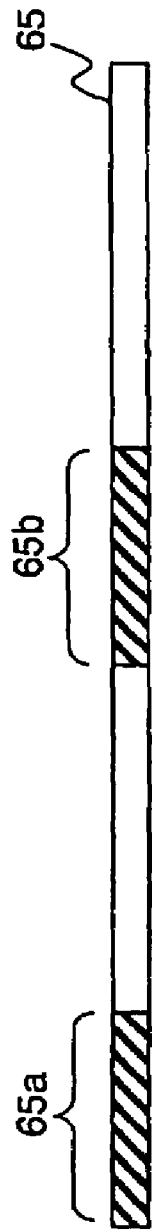

FIG. 13 schematically shows an example of an IC tag memory.

Figure 14:
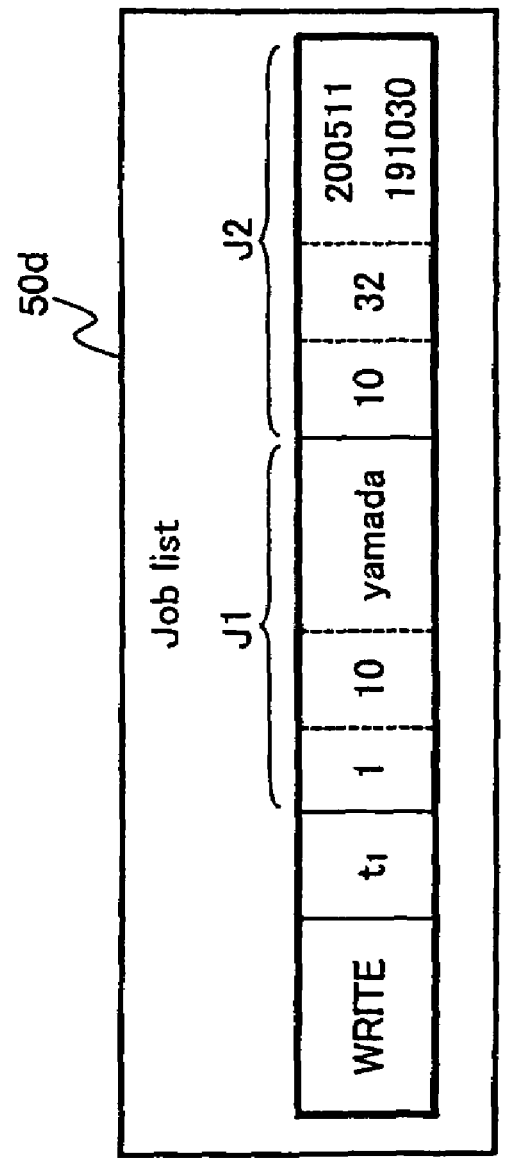

FIG. 14 illustrates an example of a case in which the detecting portion 4 generates a divided command to write in a worker ID and a divided command to write in a passage time h1 and adds them to a job list.

DETAILED DESCRIPTION OF THE INVENTION

In the tag access control system according to the present invention, it is preferable that the dividing portion generates the plurality of divided commands by dividing a size of the data to be written in the IC tags or the data to be read from the IC tags indicated by the command into a plurality of divided data sizes and generating divided commands to be read from the IC tags or divided commands to be written in the IC tags for each of the plurality of divided data sizes.

Since the dividing portion generates the divided commands for each of the divided data sizes obtained by dividing the size of the data to be written in the IC tags or the data to be read from the IC tags indicated by the command, the job controlling portion can distribute the writing processing or the reading processing for each of the divided data sizes to a plurality of reader/writers and cause them to execute that processing. Therefore, the success rate of the processing of writing the data in the IC tags or the processing of reading the data from the IC tags improves.

For example, even in the case where a time period for which a target IC tag is present within the communication range of an antenna provided in a single reader/writer is not sufficient for completing the processing of writing data indicated by the command, a plurality of reader/writers are made to execute respectively the processing of writing divided data sizes obtained by dividing that data, thereby making it possible to complete the processing of that command.

In the tag access control system according to the present invention, it is preferable that the job controlling portion detects a predetermined number of identifiers of the IC tags located within the communication ranges of the antennas of the reader/writers as a tag group, stores the individual identifiers included in the tag group in the storing portion in association with the job list and sequentially assigns the plurality of reader/writers the plurality of divided commands indicated by the job list associated with the IC tags of the identifiers included in the tag group.

In the case where a group of articles provided with a predetermined number of IC tags move, the job controlling portion detects a predetermined number of the IC tags of that group of articles as the tag group, thus improving detection reliability.

In the tag access control system according to the present invention, it is preferable that the job controlling portion selects a divided command to be executed based on the result of executing the divided commands in a part of the plurality of reader/writers of the antennas preceding in the moving path of the article and assigns a reader/writer other than the part of the plurality of reader/writers the selected divided command.

In this way, the job controlling portion can assign the divided command dynamically according to the result of executing the preceding divided commands. As a result, the success rate of the command improves. For example, when the divided command in a reader/writer preceding in the moving path is failed, the job controlling portion can cause the other reader/writer to re-execute the same divided command. Also, in the case where the preceding divided command is completed ahead of schedule and some time is left, it is also possible to execute the divided command by moving up the schedule.

In the tag access control system according to the present invention, it is preferable that the dividing portion divides a size of data to be read from the IC tag or data to be written in the IC tag indicated by a divided command remaining after deleting divided commands that are successfully executed by the reader/writers preceding in the moving path of the article from the job list into a plurality of divided data sizes and generates divided commands to read from the IC tag or to write in the IC tag for each of the plurality of divided data sizes.

In this way, when the reader/writers preceding in the moving path successfully executes the divided commands, the job controlling portion divides the size of the data to be read from the IC tag or the data to be written in the IC tag for the remaining divided command into the plurality of divided data sizes, and thus can generate the divided data sizes considering the result of executing the preceding divided commands.

In the tag access control system according to the present invention, it is preferable further to include a velocity measuring portion for measuring a moving velocity of the article, and a movement information generating portion for generating information indicating a time period for which the IC tags are expected to be present within the communication ranges of the plurality of antennas using the moving velocity and storing the information in the storing portion as the movement information.

Since the movement information generating portion generates the information indicating the time period for which the IC tags are expected to be present within the communication range of each of the reader/writers using the moving velocity of the article measured by the velocity measuring portion as the movement information, movement information according to an actual article moving velocity is generated. Because the job controlling portion assigns the plurality of reader/writers the plurality of jobs based on the movement information, the job can be assigned so as to be suitable for the actual article moving velocity.

The following is a specific description of embodiments of the present invention, with reference to the accompanying drawings.

Embodiment 1

Figure 1:
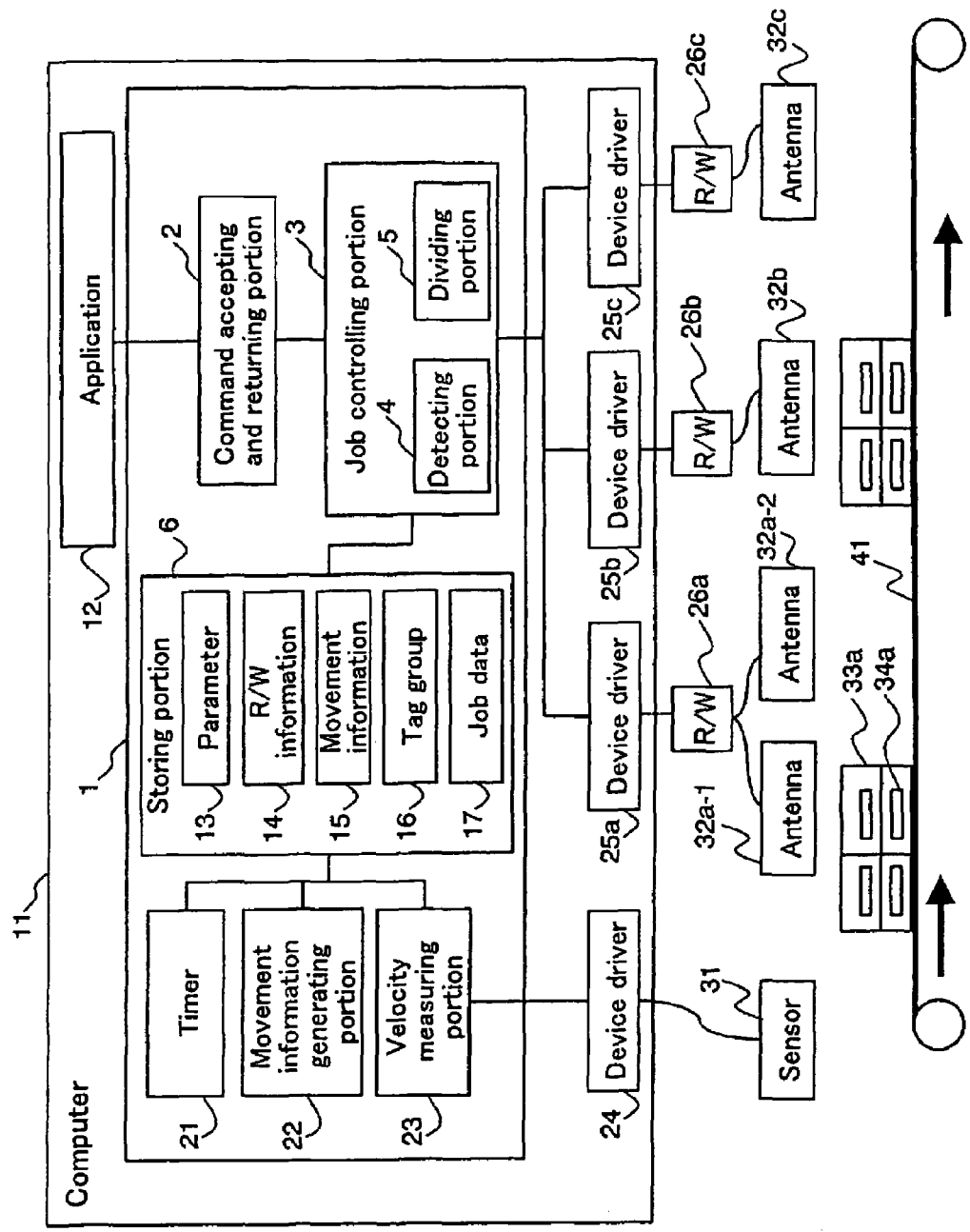
FIG. 1 is a functional block diagram showing a configuration of a tag access control system in Embodiment 1.

FIG. 1 is a functional block diagram showing a configuration of a tag access control system in the present embodiment. A tag access control system 1 shown in FIG. 1 is implemented as software operating on a computer 11. The computer 11 is connected with a sensor 31 and reader/writers (in the following, referred to as R/Ws) 26a, 26b and 26c.

The R/W is a device that sends a command to an IC tag and receives response data from the IC tag in response to the sent command, thereby reading data stored in the IC tag or writing data in the IC tag.

The R/W 26a is provided with antennas 32a-1 and 32a-2, the R/W 26b is provided with an antenna 32b, and the R/W 26c is provided with an antenna 32c. The R/W 26a sends a command to and receives a response from IC tags located within communication ranges of the antennas 32a-1 and 32a-2 by radio. In a similar manner, the R/W 26b and the R/W 26c respectively send a command to and receive a response from IC tags located within communication ranges of the antennas 32b and 32c by radio.

It should be noted that one R/W may have one antenna or a plurality of antennas. In the example illustrated by FIG. 1, only the R/W 26a has two antennas. However, the number of antennas provided in each R/W is not limited to that in the example illustrated by FIG. 1.

In the example illustrated by FIG. 1, the antennas 32a-1, 32a-2, 32b and 32c are aligned at constant intervals. A belt conveyor 41 is disposed along the alignment direction of the antennas 32a-1, 32a-2, 32b and 32c. In this way, an article 33a mounted on the belt conveyor 41 moves so as to pass through the communication ranges of the antennas 32a-1, 32a-2, 32b and 32c sequentially. The article 33a is provided with an IC tag 34a.

Incidentally, in the example illustrated by FIG. 1, four articles are moved as one group by the belt conveyor 41. However, the number of articles included in one group is not limited to four.

Upstream of the belt conveyor 41 is provided with the sensor 31. The sensor 31 detects the velocity of an article that moves on the belt conveyor 41 and enters the communication range of the antenna 32a-1.

In the computer 11, an application 12 for issuing a command for sending a command to and receiving a response from an IC tag is implemented, for example. The tag access control system 1 is implemented under the application 12 as middleware for controlling the R/Ws 26a, 26b and 26c and the sensor 31.

The application 12 is software for carrying out a process control, a distribution management, a production control or the like, for example.

Furthermore, the computer 11 is provided with a device driver 24 for controlling the sensor 31 and device drivers 25a, 25b and 25c for respectively controlling the R/Ws 26a, 26b and 26c. The tag access control system 1 can control the R/Ws 26a, 26b and 26c via the device drivers 25a, 25b and 25c.

The tag access control system 1 includes a command accepting and returning portion 2, a job controlling portion 3, a detecting portion 4, a dividing portion 5, a storing portion 6, a timer 21, a movement information generating portion 22 and a velocity measuring portion 23.

The command accepting and returning portion 2 is an interface section between the application 12 and the tag access control system 1. The command accepting and returning portion 2 accepts from the application 12 a command indicating an instruction to write data in an IC tag or a command indicating an instruction to read data from an IC tag, for example. Further, the command accepting and returning portion 2 returns a result of processing the accepted command to the application 12.

The dividing portion 5 generates a plurality of divided commands for executing the instruction indicated by the command accepted by the command accepting and returning portion 2. In other words, the dividing portion 5 divides the command into a plurality of smaller commands. The divided commands generated by the dividing portion 5 are stored in the storing portion 6 as job data 17, for example.

The detecting portion 4 causes the R/Ws 26a, 26b and 26c to detect at least one identifier (in the following, referred to as an ID) of an IC tag located within the communication ranges of their respective antennas. The command accepted by the command accepting and returning portion 2 is executed, for example, on each IC tag of the ID detected by the detecting portion 4. In that case, data associating the IDs of the IC tags detected by the detecting portion 4 and the plurality of divided commands generated by the dividing portion 5 with each other are stored in the storing portion 6. Moreover, the detecting portion 4 also may store IDs of the predetermined number of IC tags in the storing portion 6 as a tag group 16, for example.

When the detecting portion 4 gives any one of the R/Ws 26a, 26b and 26c an instruction to detect an ID of the IC tag located within the communication range of the antenna, the R/W given this instruction can detect IDs of a plurality of IC tags located within the communication range of the antenna provided in the R/W by utilizing a technology called collision arbitration, for example.

The job controlling portion 3 sequentially assigns the R/Ws 26a, 26b and 26c the plurality of divided commands associated with the IC tags of the IDs detected by the detecting portion 4 and makes them execute these commands. The job controlling portion 3 distributes and sequentially sends the plurality of divided commands to the R/Ws 26a, 26b and 26c. In the case of sending the divided commands to the R/W 26a having two antennas, the job controlling portion 3 sends, for example, information specifying the antenna for communication together with the divided command to the R/W 26a. The communication between the R/W 26a, 26b, 26c and the IC tag is carried out according to a communication mode defined by ISO 15693 or ISO 18000-6, for example.

The velocity measuring portion 23 measures a moving velocity of the article 33a moving on the belt conveyor 41 using the sensor 31 and stores it in the storing portion 6 (not shown). The movement information generating portion 22 generates information indicating a time period for which the IC tag is present within the communication range of each of the antennas 32a-1, 32a-2, 32b and 32c, and stores it in the storing portion 6 as movement information 15.

Using the movement information 15 and R/W information 14 that are stored in the storing portion 6 and a present time obtained by the timer 21, the job controlling portion 3 can predict a position and a time of the IC tag moving on the belt conveyor 41. Thus, the job controlling portion 3 is capable of an appropriate assignment according to the movement of the IC tag when assigning the R/Ws 26a, 26b and 26c the plurality of divided commands.

The computer 11 can be, for example, a general-purpose computer such as a personal computer, a server or a workstation. Moreover, the computer 11 may be a computer exclusively for an R/W control. A CPU provided in the computer 11 executes a predetermined program, thereby realizing functions of the command accepting and returning portion 2, the job controlling portion 3, the detecting portion 4, the dividing portion 5, the movement information generating portion 22 and the velocity measuring portion 23.

Also, examples of the storing portion 6 can include not only a hard disk provided in the computer 11 and an external storage such as a flexible disk or a DVD but also a semiconductor memory such as a RAM or a ROM with respect to which the CPU can read and write data directly.

It should be noted that the configuration of the tag access control system 1 is not limited to that shown in FIG. 1. For example, the function of the tag access control system 1 also can be distributed to a plurality of computers. Further, a program for realizing the functions of the command accepting and returning portion 2, the job controlling portion 3, the detecting portion 4, the dividing portion 5, the movement information generating portion 22 and the velocity measuring portion 23 is installed in the computer 11 through a network or a recording medium, thereby making it possible to configure the tag access control system 1.

Figure 2:
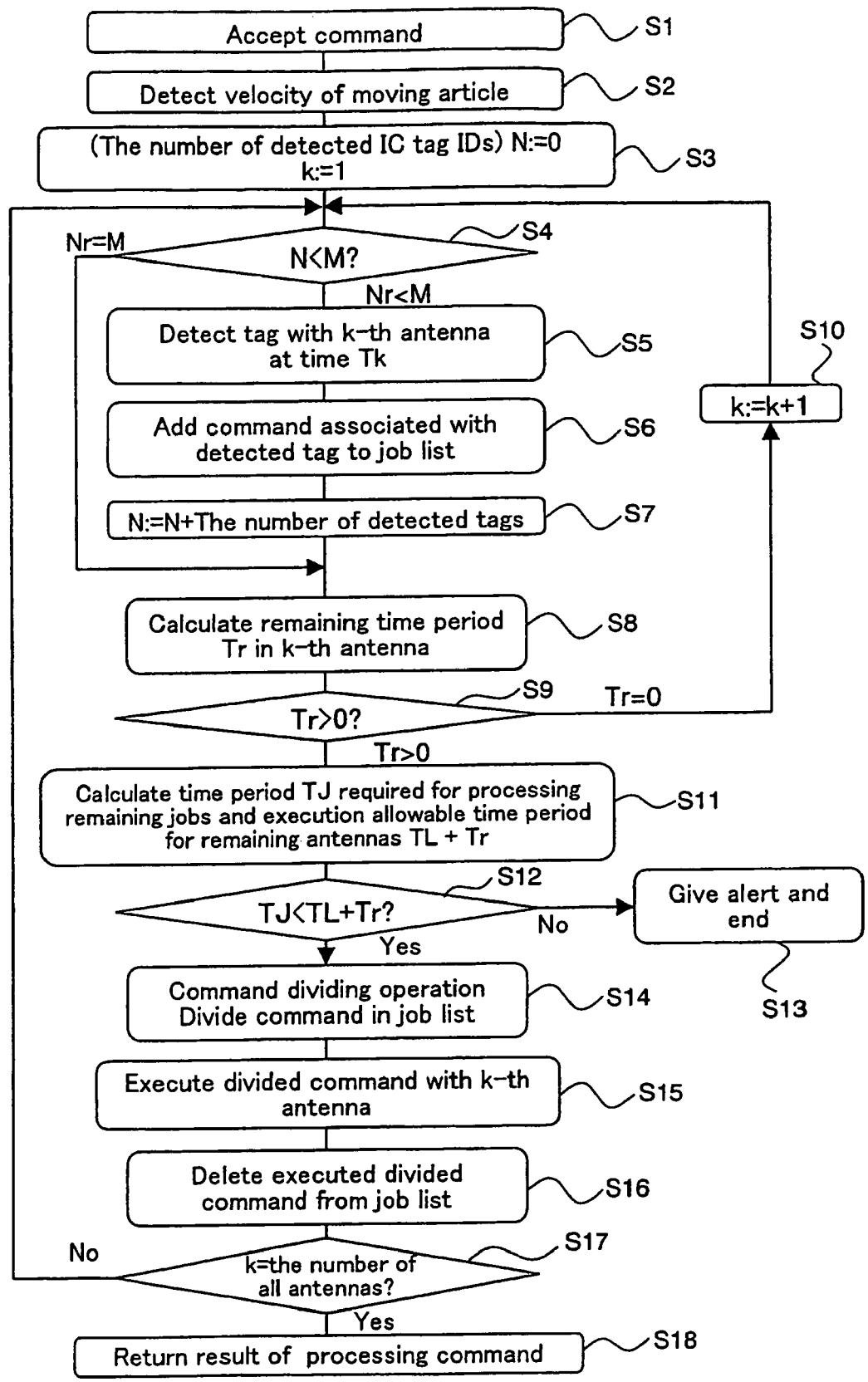
FIG. 2 is a flowchart showing an example of an operation since a tag access control system 1 accepts a command until it returns a result of processing.

Now, the following description will be directed to an example of an operation in which the tag access control system 1 controls the R/Ws 26a, 26b and 26c and sends commands to and receives responses from an IC tag according to a command from the application 12. FIG. 2 is a flowchart showing an example of an operation since the tag access control system 1 accepts the command from the application 12, and performs processing according to this command until it returns the result of the processing.

In the operation shown in FIG. 2, the command accepting and returning portion 2 first accepts the command from the application 12 (Step S1). The command is, for example, an instruction to write data in an IC tag or an instruction to read data from an IC tag.

FIG. 3A illustrates an example of the command indicating the instruction to read data from an IC tag. The command shown in FIG. 3A contains a READ instruction, an offset indicating a position of starting reading and the number of bytes indicating the amount of data to be read in. The command shown in FIG. 3A indicates, for example, a (READ) instruction to read 10 bytes of data from the top (0) of a memory of the IC tag.

FIG. 3B illustrates an example of the command indicating the instruction to write data in an IC tag. The command shown in FIG. 3B contains a WRITE instruction, an offset indicating a position of starting writing and the number of bytes indicating the amount of data to be written as well as the data to be written. The command shown in FIG. 3B indicates, for example, a (WRITE) instruction to write "Data1" in a region of 10 bytes from the top (0) of a memory of the IC tag.

Hereinafter, the case in which the command accepting and returning portion 2 accepts the command to read out data from an IC tag will be described as an example. After accepting the command, the velocity measuring portion 23 activates the sensor 31 and waits until the sensor 31 detects the article 33a. When the sensor 31 detects the moving article 33a, the velocity measuring portion 23 measures its velocity v (Step S2).

It is preferable that the velocity measuring portion 23 acquires a time $T_0$ at which the sensor detects the article 33a from the timer 21 and stores it in the storing portion 6. Using the time $T_0$, the velocity v and the R/W information 14 pre-stored in the storing portion 6, the movement information generating portion 22 can predict a time period for which the article 33a is present within the communication range of each of the antennas 32a-1, 32a-2, 32b and 32c.

The R/W information 14 is data indicating, for example, the number of antennas provided in each of the R/Ws 26a, 26b and 26c, a position of each antenna, an interval between antennas, a size of the communication range of each antenna, etc. FIG. 4 schematically shows an example of the data contained in the R/W information 14. In FIG. 4, an x-axis indicates the positions of the antennas 32a-1, 32a-2, 32b and 32c along their alignment direction. In FIG. 4, dotted lines r1, r2, r3 and r4 represent the communication ranges of the antennas 32a-1, 32a-2, 32b and 32c, respectively. Positions p1, p2, p3 and p4 on the x-axis can be set to values representing the positions of the antennas 32a-1, 32a-2, 32b and 32c, respectively. Furthermore, lengths a1, a2, a3 and a4 indicate the lengths of the communication ranges of the respective antennas 32a-1, 32a-2, 32b and 32c in the x-axis direction.

Using the positions p1, p2, p3 and p4, the lengths a1, a2, a3 and a4 that are shown in FIG. 4, and the time $T_0$ and the velocity v that are measured by the velocity measuring portion 23, the movement information generating portion 22 can generate the movement information 15 indicating the time period for which the IC tag is present within the communication ranges of the plurality of antennas. The movement information 15 is stored in the storing portion 6. The movement information 15 is data indicating, for example, times $T_1$, $T_2$, $T_3$ and $T_4$ at which the article enters the communication ranges of the respective antennas 32a-1, 32a-2, 32b and 32c and time periods $T_{a1}$, $T_{a2}$, $T_{a3}$ and $T_{a4}$ for which the article is present within the communication ranges of the respective antennas 32a-1, 32a-2, 32b and 32c.

FIG. 5 schematically shows examples of the times $T_1$, $T_2$, $T_3$ and $T_4$ and the time periods $T_{a1}$, $T_{a2}$, $T_{a3}$ and $T_{a4}$. In FIG. 5, the horizontal axis indicates a transition of time. The movement information generating portion 22 calculates the times $T_1$, $T_2$, $T_3$ and $T_4$ and the time periods $T_{a1}$, $T_{a2}$, $T_{a3}$ and $T_{a4}$ as shown in FIG. 5 and stores them in the storing portion 6 as the movement information 15. These values are utilized in the operation described later.

When the velocity v of the article 33a is measured, the job controlling portion 3 initializes a variable (Step S3). For example, an antenna counter k is set to 1, and the number of detected IC tag IDs N is set to 0. In this case, k=1 means that the currently targeted antenna is the first antenna (namely, the antenna 32a-1). N=0 means that the current number of the detected IC tag IDs is 0.

Next, the job controlling portion 3 judges whether or not the current number of the detected IC tag IDs has reached the expected number of tags M in the tag group (Step S4). In other words, the number of IC tags included in a single tag group can be the number of IC tags to be processed by a single command. The expected number of tags M in the tag group is pre-stored in the storing portion 6 as a parameter 13. For example, in the case where four articles are predetermined to be packaged and move, M=4 is stored. As described above, it is preferable that the number of tags in the tag group is determined according to the state of the article.

Since the current number of the detected IC tag IDs N is 0 and has not reached the expected number of tags M (N<M), the detecting portion 4 detects a tag via the first antenna 32a-1 at time $T_1$ (Step S5). Here, time $T_1$ is a time at which the article is expected to enter the communication range of the first antenna, and stored in the storing portion 6 as the movement information 15. The detecting portion 4 issues a detection command for detecting the ID of the IC tag located within the communication range of the antenna 32a-1 to the R/W 26a, for example, a predetermined number of times (for example, R times). The R times may be pre-stored in the storing portion 6 as the parameter 13, for example.

Furthermore, the detecting portion 4 may also issue the detection command repeatedly until the IDs of the IC tags as many as the expected number of tags M are detected. Also, if no ID is detected even after issuing the detection commands a predetermined times consecutively, the detecting portion 4 may determine that no article is present within the communication range of the antenna 32a-1 and end the detecting operation.

The detecting portion 4 adds a set of data constituted by the detected IC tag IDs and the command accepted by the command accepting and returning portion 2 to a job list (Step S6). The job list is, for example, data storing sets of data constituted by the IC tag IDs and the command for a plurality of IDs. The processing for executing the command is represented by data called a job. The job list is stored in the storing portion 6 as a part of the job data 17, for example. Further, the detecting portion 4 adds the number of detected IC tag IDs to N (Step S7).

FIG. 6A illustrates an example of the job list in which the IC tag IDs detected by the detecting portion 4 are stored. A job list 50a shown in FIG. 6A is an exemplary job list in the case where the command accepting and returning portion 2 accepts the command shown in FIG. 3A, for instance. The job list 50a is constituted by a list of data containing a data portion 51 representing an ID of an IC tag and a data portion 52a representing a command. The data portion 52a representing a command contains a READ instruction, an offset indicating a position of starting reading and the number of bytes indicating the amount of data to be read, similarly to the command shown in FIG. 3A. The job list illustrated by FIG. 6A shows that the command shown in FIG. 3A is executed on each of the IC tags whose IDs ($t_1$, $t_2$, $t_3$, . . . $t_4$) are detected by the detecting portion 4.

In the case where the detecting portion 4 detects again the IC tag ID that is already added to the job list, it is preferable not to add that ID to the job list. This avoids duplicate registration of the same IDs.

After the detecting operation by the detecting portion 4 (Steps S5, S6 and S7), the job controlling portion 3 calculates a remaining time period Tr for which the current communication with the IC tag in the antenna 32a-1 can be carried out (Step S8). The time period Tr can be calculated, for example, by using a present time obtained from the timer 21, time $T_1$ and time period $T_{a1}$ for which the IC tag is present in the antenna 32a-1. The job controlling portion 3 judges whether or not there is any remaining time period Tr left (Step S9).

If the time period Tr for which the communication with the IC tag in the current antenna can be carried out is 0 (Tr=0), the job controlling portion 3 adds 1 to the antenna counter k and sets k=2 (Step S1). In this manner, the targeted antenna changes to the second antenna 32a-2. If the remaining time period Tr is not 0, the dividing portion 5 calculates a time period TJ that is expected to be required for processing all the unprocessed jobs (in the following, referred to as remaining job processing expected time period TJ) and a value of an execution allowable time period for the remaining antennas TL+Tr (Step S11).

The remaining job processing expected time period TJ can be obtained by, for example, calculating time periods required for processing individual unprocessed jobs and summing them up. Also, the execution allowable time period for the remaining antennas TL can be obtained, for example, as a sum of pieces of the movement information 15 of the individual antennas (the time periods for which the moving tag is present in the individual antennas).

The dividing portion 5 compares the calculated remaining job processing expected time period TJ and the value of the execution allowable time period for the remaining antennas TL+Tr (Step S12). If the remaining job processing expected time period TJ is smaller than the value of the execution allowable time period for the remaining antennas TL+Tr (Yes in Step S12), a command dividing operation is performed (Step S14). The command dividing operation will be described later.

If the remaining job processing expected time period TJ is larger than the value of the execution allowable time period for the remaining antennas TL+Tr (No in Step S12), it is impossible to execute all the jobs with the remaining antennas, so that an alert is given to the application at this time (Step S13). Depending on working examples, the jobs may be executed as far as possible without giving an alert, and the results may be returned to the application.

When the targeted antenna changes to the second antenna 32a-2, the job controlling portion 3 judges again whether or not the number of detected IC tag IDs N has reached the expected number of tags M (Step S4). If the number of IC tag IDs N detected by the first antenna 32a-1 already reaches the expected number of tags M (N=M), the detecting operations of Steps S5, S6 and S7 are not performed. In this case, since the remaining time period Tr calculated in Step S8 is not usually 0, the dividing portion 5 performs the command dividing operation (Step S14).

In the dividing operation, the dividing portion 5, for example, further divides the command associated with the IC tag ID added to the job list in Step S6 into a plurality of divided commands, thus generating a new job list.

FIG. 6B illustrates an example of a job list 50b newly generated by dividing the command contained in the job list 50a shown in FIG. 6A by the dividing portion 5. The dividing portion 5, for example, divides the command for each IC tag ID into a plurality of divided commands. For instance, a command associated with IC tag ID=$t_1$ indicates an instruction to read 10 bytes of data from the top (0) of a memory of the IC tag. The dividing portion 5 can divide this command into, for example, a divided command to read 5 bytes of data from the top (0) of the memory of the IC tag and a divided command to read 5 bytes of data from the fifth byte from the top of the memory of the IC tag.

For example, a command associated with IC tag ID=$t_2$ shown in FIG. 6B is divided into m divided commands $J_1, J_2, J_3, \ldots J_m$.

As an example, the following is a description of the case where the command before division is an instruction to read b bytes of data from the f-th byte from the top of the memory of the IC tag (offset=f, the number of bytes=b) and where this command is divided into m divided commands. When s is the smallest integer that is not smaller than b/m, the divided commands $J_1, J_2, J_3, \ldots J_m$ after division can be represented as $J_1$: offset=f, the number of bytes=s
$J_2$: offset=f+s, the number of bytes=s
$J_3$: offset=f+2s, the number of bytes=s
. . .
$J_m$: offset=f+ms, the number of bytes=b−(m−1)s.

As described above, the dividing portion 5 can divide the data to be read from the IC tag indicating the command into a plurality of data and generates a plurality of divided commands to read each of the plurality of divided data. Similarly, it is also possible to divide the command to write data in the IC tag into a plurality of divided commands to write the plurality of divided data.

Here, it is preferable that the division number m is determined based on, for example, the amount of data to be read by the command before division and the communicable time period between an IC tag and a plurality of R/Ws. An operation in which the dividing portion 5 calculates the division number m and generates the divided commands will be described in detail below.

The job controlling portion 3 causes the R/W 26a to execute the divided commands generated by the dividing portion 5 via the current antenna 32a-2 (k=2nd antenna) (Step S15). For example, the job controlling portion 3 sends the R/W 26a the divided commands of IC tag ID=$t_1$ in the job list 50b shown in FIG. 6B one by one sequentially together with information that the commands are executed using the antenna 32a-2 and acquires the results of processing the individual divided commands. Similarly, the job controlling portion 3 sends the R/W 26a the divided commands contained respectively in IC tag ID=$t_2, t_3 \ldots$ one by one sequentially and acquires the results of processing the individual divided commands.

In the case where the results of processing the divided commands are not successful a predetermined times consecutively, for example, the job controlling portion 3 may end the divided command executing operation via the current antenna (Step S15). In this manner, as long as an IC tag is present within the communication range of the current antenna and unless the divided commands are unsuccessful, the divided command executing operation is continued.

It should be noted that the job controlling portion 3 may end the divided command executing operation (Step S15) after a certain time period. Also, when all the divided commands in the job list are executed, the divided command executing operation (Step S15) ends.

The job controlling portion 3 deletes the divided command whose processing result is successful in the divided command executing operation (Step S15) via the current antenna from the job list (Step S16). In this manner, only an unexecuted divided command or a divided command whose execution has been failed remains in the job list. As a result, a divided command that needs to be executed is selected and remains in the job list.

FIG. 6C illustrates an example of the job list obtained by deleting the successful divided commands from the job list 50b shown in FIG. 6B. In the job list 50c shown in FIG. 6C, the divided command of IC tag ID=$t_1$ and the divided commands $J_1$ and $J_2$ of IC tag ID=$t_2$ among the divided commands contained in the job list 50b are deleted.

Moreover, it is preferable that the results of processing the divided commands are stored in the storing portion 6 as a part of the job data 17. FIG. 7 illustrates an example of data representing the results of processing the divided commands. In the example shown in FIG. 7, data representing the division number, completion and divided command are stored for each IC tag ID. The job controlling portion 3 updates the data representing the completion of the IC tag IDs whose results of processing the divided commands are all successful to "1", for example. In this manner, information indicating whether or not the processing is completed is stored for each IC tag.

Furthermore, the tag group 16 indicating the results of processing for each tag group, which is a group of IC tags, may be stored in the storing portion 6. FIG. 8 illustrates an example of data representing the result of processing for each tag group. In the example shown in FIG. 8, for each tag group ID, data representing the completion and data representing IDs of IC tags included in a tag group of that tag group ID are stored. In this way, information indicating whether or not the processing is completed is stored for each tag group. The job controlling portion 3 can update the results of processing for each tag group based on the result of processing for each IC tag, for example.

For instance, it is preferable that a group of IC tags to be processed by one command accepted by the command accepting and returning portion 2 from the application 12 is handled as one tag group. In this way, the result of processing for each tag group represents the result of processing for each command.

The job controlling portion 3 judges whether or not the counter k of the current antenna has reached the number of all antennas controlled by the tag access control system 1 (Step S17).

If the counter k of the current antenna is 2, k has not reached 4, which is the number of all antennas (No in Step S17). Thus, the job controlling portion 3 performs the operation of Step S4 again. Since the number of the IDs N detected via the first antenna has already reached the expected number of tags M (N=M) in Step S4, the operations of Steps S5 to S7 are not carried out, and the remaining time period Tr in the second antenna is calculated in Step S8. Since the divided command executing operation of Step S15 has already been performed via the second antenna, it is likely that the remaining time period Tr=0. If Tr=0, k is incremented (Step S10), and the targeted antenna changes to the third antenna (namely, the antenna 32b).

Thereafter, the job controlling portion 3 performs the operations of Steps S4, S8, S9, S11 and S12, and the dividing portion 5 performs the command dividing operation (Step S14). At this time, in the job list, as shown in FIG. 6C, for example, the divided command executed via the second antenna is deleted. The dividing portion 5 can further divide the divided command in the job list. Also, the dividing portion 5 may judge whether or not the divided command in the job list is to be further divided based on a total amount of data to be read by the divided command remaining in the job list and a communicable time period between an IC tag and a plurality of R/Ws, for example. As a result, it may be judged not to divide the command.

The job controlling portion 3 causes the R/W 26b to execute the divided commands via the third antenna (Step S15). The successfully processed divided command is deleted from the job list (Step S16). The job controlling portion 3 judges whether or not the antenna counter k has reached the number of all antennas (Step S17). In this manner, the above-described operation is repeated until k reaches the number of all antennas.

If k has reached the number of all antennas (Yes in Step S17), the command accepting and returning portion 2 generates a result of processing the command based on the result of processing the divided command of the ID of each IC tag (Step S18). In the case where the tag group is created for each command, the command accepting and returning portion 2 can return the result of processing for each tag group shown in FIG. 8 to the application 12 as the result of processing the command.

(Specific Example of Operation in which the Dividing Portion 5 Divides Command or Divided Command)

Herein, a specific example of the command dividing operation in Step S14 will be described. FIG. 9 is a flowchart showing a specific example of an operation in which the dividing portion 5 divides a command or a divided command in the job list. As shown in FIG. 9, the dividing portion 5 first acquires the number of bytes B of the divided command whose handling data have the largest number of bytes among the divided commands contained in the job list (Step S21).

Further, the dividing portion 5 determines the total number J of divided commands contained in the job list (Step S22). Then, the dividing portion 5 determines a time period Ta for which the communication with a single IC tag can be carried out via one antenna (Step S23). For example, Ta can be determined by Ta=a/v using a length a of a communication range of the antenna and a moving velocity v of an article.

The dividing portion 5 determines an average time period Tb required for executing the divided command handling the data as much as the number of bytes B (Step S24). For example, Tb can be pre-stored in the storing portion 6. The dividing portion 5 sets the division number $d_0$=1 so as to initialize $d_0$ (Step S25).

The dividing portion 5 determines the number r of divided commands executable via one antenna and the number r' of divided commands performed in the remaining time period via the current antenna (Step S26). For example, using the communicable time period Ta for which the communication with the same IC tag can be carried out via one antenna, the division number $d_0$ and the average time period Tb required for the divided command with the number of bytes B, the dividing portion 5 can determine the number r of divided commands executable via one antenna by Equation 1 below.

$$r = \text{floor}(Ta \times d_0 / Tb) \qquad \text{(Equation 1)}$$

In Equation 1 above, floor (X) represents the largest integer that does not exceed X.

Also, using the remaining time period Tr, for which the communication can be carried out via the current antenna, calculated in Step S8 in FIG. 2, the dividing portion 5 can determine the number r' of divided commands executable via the current antenna by Equation 2 below.

$$r' = \text{floor}(Tr \times d_0 / Tb) \qquad \text{(Equation 2)}$$

In Equation 2 above, floor (X) also represents the largest integer that does not exceed X.

Next, the dividing portion 5 judges whether or not a value (r) obtained by adding r' to r×the number of remaining antennas exceeds $d_0 \times J$ (Step S27). In the case of No in Step S27, 1 is added to $d_0$ (Step S28), r and r' are calculated again (Step S26), and then it is judged whether or not the r×the number of remaining antennas+r' exceeds $d_0 \times J$ (Step S27). Until r×the number of remaining antennas+r' exceeds $d_0 \times J$ (Yes in Step S27), the operations of adding 1 to $d_0$ and calculating r and r' are repeated.

If r×the number of remaining antennas+r' exceeds $d_0 \times J$ (Yes in Step S27), the dividing portion 5 initializes a loop counter n (n:=0) and performs the command dividing operation (Step S30, Step S31).

The dividing portion 5 judges whether or not the divided command or the command of the n-th ID in the job list is already divided into $d_0$ (Step S30), and if No, divides the divided command or the command of the n-th ID into $d_0$ (Step S31). In the case of Yes in Step S30, the divided command of that ID is not divided. The dividing portion 5 repeats the operations of making the above-described judgment of Step S30 for the divided commands of all the IDs in the job list and, in the case of No, dividing the divided command in Step S31. By making the above-described judgment of Step S30, only the divided command of the ID that needs dividing is divided.

The above description has been directed to an embodiment of the present invention. However, the present invention is not limited to the above-described embodiment. Although the velocity measuring portion 23 measures the article velocity v using the sensor 31 in the present embodiment, the article velocity v also can be pre-stored in the storing portion 6 in the case where the velocity v is substantially constant.

Additionally, the present embodiment has been directed to the case in which one article is provided with one IC tag. However, the tag access system according to the present invention is also applicable to the case in which one article is provided with a plurality of IC tags.

Embodiment 2

FIG. 10 is a functional block diagram showing a configuration of a tag access control system in Embodiment 2. The function of the tag access control system in the present embodiment is distributed to a computer 28 and a plurality of R/Ws 27a and 27b. In the configuration shown in FIG. 10, the computer 28, the R/Ws 27a and 27b and a sensor 31 are connected with each other via a network 38. The computer 28 is provided with a command accepting and returning portion 2 and a storing portion 63 storing R/W information 14 as a part 1a of the function of the tag access control system. The computer 28 further includes an application 12 for issuing a command and a communication portion 61a for carrying out data communications with external portions via the network 38.

The R/W 27a is provided with a job controlling portion 3, a detecting portion 4, a dividing portion 5, a storing portion 6, an interface portion 62 and a timer 21 as a part 1b of the function of the tag access control system. The R/W 27b is also provided with a part 1c of the function of the tag access control system, similarly to the R/W 27a. The part 1c of the function of the tag access control system in the R/W 27b is similar to the part 1b of the function of the tag access control system in the R/W 27a. In addition, data having the same contents as a parameter 13, the R/W information 14, movement information 15, job data 17 and a tag group 16 stored in the storing portion 6 of the R/W 27a are stored also in the storing portion 6 of the R/W 27b.

The R/Ws 27a and 27b respectively include communication portions 61b and 61c for carrying out data communications with external portions via the network 38 and antenna controlling portions 29a and 29b for controlling antennas 32d, 32e and 32f, 32g.

The functions of the command accepting and returning portion 2, the job controlling portion 3, the detecting portion 4 and the dividing portion 5 are similar to those in Embodiment 1. The data communications between the command accepting and returning portion 2 and the job controlling portion 3 are carried out via the network 38, the communication portions 61a, 61b and the interface portion 62.

The job controlling portion 3 in the R/W 27a and the job controlling portion (not shown) in the R/W 27b carry out data communications via the interface portion 62 and the communication portion 61b. In this data communications, data such as an ID of a source R/W, an ID of a destination R/W and a job list are sent and received, for example. In the job list, an execution time at which each divided command is to be executed may be specified, or a sensor ID serving as a trigger for executing each divided command may be specified. Alternatively, in the case where the sensor is connected to each R/W, the sensor ID does not have to be specified explicitly. In this manner, for example, similarly to Embodiment 1, the processing of a command accepted by the command accepting and returning portion 2 in the computer 28 is divided into a plurality of divided commands in each of the R/Ws 27a and 27b so as to generate a job list, so that the divided commands indicated by a plurality of jobs contained in the job list are assigned to the R/Ws 27a and 27b.

In the case where the sensor ID is specified in the job list, each of the R/Ws 27a and 27b monitors an operation of the sensor specified in the job list and, when this sensor is activated, executes the divided command indicated by the job contained in the job list.

In the data communications between the R/Ws 27a and 27b when each of the R/Ws 27a and 27b executes the job in synchronization with the specified execution time, a clock adjustment upon startup and a job list specifying the time are necessary for synchronizing the timing of executing the divided commands.

For example, the command accepted by the command accepting and returning portion 2 in the computer 28 is sent together with the sensor ID serving as the trigger by the communication portion 61a to the R/W 27a. Upon receipt of information specifying the command and the sensor ID, the communication portion 61b in the R/W 27a passes the information specifying the command and the sensor ID to the dividing portion 5. The dividing portion 5 divides the command and generates, for example, a job list as shown in FIG. 6B. Triggered by the specified sensor, the job controlling portion 3 executes the divided command indicated by the job contained in that job list.

At this time, when "[job1, job2, job3]" represents a job list of remaining jobs whose executions have not been completed and "time1" represents a time at which this job list is to be executed by the R/W 27b, the data sent by the job controlling portion 3 in the R/W 27a to the R/W 27b via the communication portion 61b are expressed by (R/W 27a, R/W 27b, [job1, job2, job3], time1).

In the present embodiment, by distributing the function of the tag access control system, it is possible to both prevent the concentration of loads on the computer 28 and improve a tag access performance by parallel processing.

Embodiment 3

Embodiment 3 illustrates an example of a case where, in the computer 11 in Embodiment 1, a command issued by the application 12 is an instruction to write data in a plurality of separate positions on the memory of the IC tag.

FIG. 11 illustrates an example of a command accepted by the command accepting and returning portion 2. The command shown in FIG. 11 contains a data name of data to be written and the data to be written. The command shown in FIG. 11 is, for example, data indicating an instruction to write "yamada" as data of a worker ID and "200511191030" as data of passage time h1 in the IC tag.

In the case where the command indicating the write instruction with the data name and the data as shown in FIG. 11 is issued, data representing an association between the data name and a write position in the IC tag are necessary. FIG. 12 illustrates an example of a data table showing the association between the data names and the IC tags. The data table shown in FIG. 12 stores an offset and a size that are associated with each data name. The offset is data indicating the position on the IC tag memory at which the writing is started, and the size is data indicating the size of data that can be written.

FIG. 13 schematically shows an example of the IC tag memory in which the data shown in FIG. 12 are written.

As shown in FIG. 13, in an IC tag memory 65, a region 65a in which the data of the worker ID are written and a region 65b in which the data of the passage time h1 are written are physically separate from each other in some cases. The hatched portion 65a on the IC tag memory 65 indicates the region for the data of the worker ID, and the hatched portion 65b at a position separate from the hatched portion 65a indicates the region for the data of the passage time h1.

In the case of writing data at separate positions as in the example illustrated by FIG. 13, it is preferable to make divisions by respective data to be written at these separate positions and generate divided commands to write the respective data. For example, the detecting portion 4 can detect an IC tag ID and, when adding a command associated with that IC tag ID to a job list, generate a divided command for each data name so as to add it to the job list.

FIG. 14 illustrates an example of the case in which, upon detecting IC tag ID=t1, the detecting portion 4 generates a divided command (job J1) to write in a worker ID and a divided command (job J2) to write in a passage time h1 as divided commands for t1 and adds them to the job list. A job list 50d stores offsets indicating the respective write positions of the worker ID and the passage time h1, respective sizes of data to be written and the data to be written in association with the tag t1.

As shown in FIG. 14, the command to write data at separate positions is formed as a plurality of divided commands to write data respectively at these separated positions, thereby eliminating troublesome divisions and making it possible to assign a plurality of R/Ws the divided commands efficiently.

The present invention can be utilized, for example, at a production site such as a factory or a distribution site between a factory, a warehouse, a wholesale and a retail or the like for the purpose of improving an efficiency of a process control or a warehousing and delivery management. The fields in which the present invention can be utilized are fields of production and distribution where an application of IC tags to articles such as members, products and cases, for example, is becoming widespread.

The present invention is applicable as a tag access control system capable of reliable communications by controlling reader/writers without lowering a moving velocity of a plurality of IC tags attached to moving articles.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A tag access control system for controlling data communication between a plurality of reader/writers respectively connected to a plurality of antennas provided along a moving path of one or more articles provided with one or more IC tags and the IC tags provided in the articles moving sequentially through communication ranges of the plurality of antennas, the tag access control system comprising:
   a storing portion storing movement information about movement of the articles and reader/writer information indicating an arrangement of the antennas connected with the reader/writers;
   a command accepting portion accepting, from an upper system, a command indicating an instruction to write data in the IC tags or an instruction to read data from the IC tags;
   a dividing portion generating a plurality of divided commands from the accepted command for executing the instruction indicated by the command;
   a detecting portion causing at least one reader/writer of the plurality of reader/writers to detect an identifier of at least one of the IC tags located within the communication range of the antenna in the one reader/writer;
   a job controlling portion generating a job list, which is data associating the plurality of divided commands with each of the identifiers of the IC tags detected by the detecting portion, and sequentially assigning the plurality of reader/writers to the plurality of divided commands in the job list according to a relationship between positions of the moving IC tags and positions of the antennas that is predicted from the movement information and the reader/writer information; and
   a returning portion returning a result of processing of the command accepted by the command accepting portion to the upper system based on a result of executing the plurality of divided commands.

2. The tag access control system according to claim 1, wherein the dividing portion generates the plurality of divided commands by dividing a size of the data to be written in the IC tags or the data to be read from the IC tags indicated by the command into a plurality of divided data sizes and generating divided commands to be read from the IC tags or divided commands to be written in the IC tags for each of the plurality of divided data sizes.

3. The tag access control system according to claim 2, wherein the dividing portion divides a size of data to be read from the IC tag or data to be written in the IC tag indicated by a divided command remaining after deleting divided commands that are successfully executed by the reader/writers preceding in the moving path of the article from the job list into a plurality of divided data sizes and generates divided commands to read from the IC tag or to write in the IC tag for each of the plurality of divided data sizes.

4. The tag access control system according to claim 1, wherein the job controlling portion detects a predetermined number of identifiers of the IC tags located within the communication ranges of the antennas of the reader/writers as a tag group, stores the individual identifiers included in the tag group in the storing portion in association with the job list and sequentially assigns the plurality of reader/writers the plurality of divided commands indicated by the job list associated with the IC tags of the identifiers included in the tag group.

5. The tag access control system according to claim 1, wherein the job controlling portion selects a divided command to be executed based on the result of executing the divided commands in a part of the plurality of reader/writers of the antennas preceding in the moving path of the article and assigns a reader/writer other than the part of the plurality of reader/writers for the selected divided command.

6. The tag access control system according to claim 1, further comprising
a velocity measuring portion for measuring a moving velocity of the article, and
a movement information generating portion for generating information indicating a time period for which the IC tags are expected to be present within the communication ranges of the plurality of antennas using the moving velocity and storing the information in the storing portion as the movement information.

7. A tag access control method for controlling data communication between a plurality of reader/writers respectively connected to a plurality of antennas provided along a moving path of one or more articles provided with one or more IC tags and the IC tags provided in the articles moving sequentially through communication ranges of the plurality of antennas by using a computer, the tag access control method comprising:
reading movement information about movement of the articles and reader/writer information indicating an arrangement of the antennas connected with the reader/writers;
accepting a command indicating an instruction to write data in the IC tags or an instruction to read data from the IC tags;
generating a plurality of divided commands from the accepted command for executing the instruction indicated by the command;
detecting by at least one reader/writer in the plurality of reader/writers an identifier of at least one of the IC tags located within the communication range of an antenna of the one reader/writer;
generating a job list, which is data associating the plurality of divided commands with each of the identifiers of the IC tags detected by the detecting, and sequentially assigning the plurality of reader/writers to the plurality of divided commands in the job list according to a relationship between positions of the moving IC tags and positions of the antennas that is predicted from the movement information and the reader/writer information; and
outputting a result of processing the accepted command based on a result of executing the plurality of divided commands.

8. A recording medium storing a tag access control program for causing a computer to execute a processing of controlling data communication between a plurality of reader/writers respectively connected to a plurality of antennas provided along a moving path of one or more articles provided with one or more IC tags and the IC tags provided in the articles moving sequentially through communication ranges of the plurality of antennas, according to operations comprising:
reading movement information about movement of the articles and reader/writer information indicating an arrangement of the antennas connected with the reader/writers;
accepting a command indicating an instruction to write data in the IC tags or an instruction to read data from the IC tags;
generating a plurality of divided commands from the accepted command for executing the instruction indicated by the command;
detecting by at least one reader/writer of the plurality of reader/writers an identifier of at least one of the IC tags located within the communication range of the antenna in the one reader/writer;
generating a job list, which is data associating the plurality of divided commands with each of the identifiers of the IC tags detected by the detecting processing, and sequentially assigning the plurality of reader/writers to the plurality of divided commands in the job list according to a relationship between positions of the moving IC tags and positions of the antennas that is predicted from the movement information and the reader/writer information; and
outputting a result of processing the accepted command based on a result of executing the plurality of divided commands.

* * * * *